United States Patent
Zhang et al.

(10) Patent No.: US 12,058,239 B2
(45) Date of Patent: *Aug. 6, 2024

(54) ENCRYPTION METHOD, DECRYPTION METHOD, AND RELATED APPARATUS

(71) Applicant: Huawei Technologies Co., Ltd., Shenzhen (CN)

(72) Inventors: Lijia Zhang, Shenzhen (CN); Jing Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/453,662

(22) Filed: Aug. 22, 2023

(65) Prior Publication Data
US 2024/0064003 A1 Feb. 22, 2024

Related U.S. Application Data

(63) Continuation of application No. 17/013,643, filed on Sep. 6, 2020, now Pat. No. 11,757,623, which is a
(Continued)

(30) Foreign Application Priority Data

Oct. 27, 2011 (CN) .......................... 201110331957.0

(51) Int. Cl.
*G06F 21/00* (2013.01)
*H04L 9/06* (2006.01)
(Continued)

(52) U.S. Cl.
CPC .............. *H04L 9/0656* (2013.01); *H04L 9/12* (2013.01); *H04L 63/10* (2013.01); *H04L 63/104* (2013.01);
(Continued)

(58) Field of Classification Search
CPC .......... H04W 12/04; H04L 63/10; H04L 9/12; H04L 63/104; H04L 9/0656; H04L 2209/80
See application file for complete search history.

(56) References Cited

U.S. PATENT DOCUMENTS 8,307,204 B2  11/2012  Niemi et al.
8,862,900 B2  10/2014  Chen
(Continued)

FOREIGN PATENT DOCUMENTS

CN   101155026 A   4/2008
CN   101237461 A   8/2008
(Continued)

OTHER PUBLICATIONS

3GPP TR 23.888 V1.5.0 "3rd Generation Partnership Project; Technical Specification Group Services and System Aspects; System Improvements for Machine-Type Communications; (Release 11)," Technical Report, Oct. 2011, 155 pages.
(Continued)

*Primary Examiner* — Brandon Hoffman
*Assistant Examiner* — William A Corum, Jr.
(74) *Attorney, Agent, or Firm* — Conley Rose, P.C.

(57) ABSTRACT

A method, and related apparatuses are provided. The method comprises receiving an initial layer-3 message, wherein the initial layer-3 message comprises an indication indicating that a part of the initial layer-3 message is encrypted, and generating a keystream, wherein the keystream is used to decrypt the encrypted part of the initial layer-3 message.

20 Claims, 6 Drawing Sheets

Related U.S. Application Data continuation of application No. 15/965,854, filed on Apr. 28, 2018, now Pat. No. 10,771,966, which is a continuation of application No. 14/263,253, filed on Apr. 28, 2014, now Pat. No. 9,992,669, which is a continuation of application No. PCT/CN2012/083661, filed on Oct. 29, 2012.

(51) Int. Cl.

| | | |
|---|---|---|
| *H04L 9/12* | (2006.01) | |
| *H04L 9/40* | (2022.01) | |
| *H04W 12/02* | (2009.01) | |
| *H04W 12/033* | (2021.01) | |
| *H04W 12/04* | (2021.01) | |
| *H04W 4/70* | (2018.01) | |

(52) U.S. Cl.
CPC ......... *H04W 12/02* (2013.01); *H04W 12/033* (2021.01); *H04W 12/04* (2013.01); *H04L 2209/80* (2013.01); *H04W 4/70* (2018.02)

(56) References Cited

U.S. PATENT DOCUMENTS

| | | |
|---|---|---|
| 2005/0213752 A1 | 9/2005 | Hawkes et al. |
| 2006/0039556 A1 | 2/2006 | Suen et al. |
| 2007/0286415 A1 | 12/2007 | Bertoni et al. |
| 2007/0297367 A1 | 12/2007 | Wang et al. |
| 2008/0101414 A1 | 5/2008 | Zhang |
| 2009/0111423 A1 | 4/2009 | Somasundaram et al. |
| 2010/0115275 A1 | 5/2010 | Suh et al. |
| 2011/0299681 A1 | 12/2011 | Kubota et al. |
| 2011/0311043 A1 | 12/2011 | Sibert et al. |
| 2013/0046968 A1 | 2/2013 | Dinan |
| 2013/0051338 A1 | 2/2013 | Ryu |
| 2013/0301611 A1 | 11/2013 | Baghel et al. |
| 2014/0016614 A1 | 1/2014 | Velev et al. |
| 2014/0036685 A1 | 2/2014 | Kim et al. |

FOREIGN PATENT DOCUMENTS

| | | |
|---|---|---|
| CN | 101453708 A | 6/2009 |
| CN | 102215077 A | 10/2011 |
| EP | 1865654 A8 | 4/2008 |
| EP | 2034687 A1 | 3/2009 |
| EP | 2148535 A2 | 1/2010 |
| WO | 2008019178 A2 | 2/2008 |

OTHER PUBLICATIONS

3GPP TS 33.401 V10.2.0 "3rd Generation Partnership Project; Technical Specification Group Services and System Aspects; 3GPP System Architecture Evolution (SAE); Security architecture (Release 10)," Technical Specification, Sep. 2011, 116 pages.

3GPP TS 23.401 V10.5.0 "3rd Generation Partnership Project; Technical Specification Group Services and System Aspects; General Packet Radio Service (GPRS) enhancements for Evolved Universal Terrestrial Radio Access Network (E-UTRAN) access (Release 10)," Technical Specification, September 282 pages.

3GPP TS 24.301 V11.0.0, "3rd Generation Partnership Project; Technical Specification Group Core Network and Terminals; Non-Access-Stratum (NAS) protocol for Evolved Packet System (EPS); Stage 3 (Release 11)," Technical Specificaiton, Sep. 2011, 322 pages.

3GPP TS 33.401, V11.1.0, "3rd Generation Partnership Project; Technical Specification Group Services and System Aspects; 3GPP System Architecture Evolution (SAE); Security architecture (Release 11)," Technical Specification, Sep. 2011, 123 pages.

3GPP TS 24.007 v10.0.0, "3rd Generation Partnership Project; Technical Specification Group Core Network and Terminals; Mobile radio interface signaling layer 3; General aspects (Release 10)", Mar. 2011, 149 pages.

Kent S., "IP Encapsulating Security Payload (ESP)," RFC 4303, Dec. 1, 2005, XP093135970, 44 pages.

David A. McGrew, et al., "The Stream Cipher Encapsulating Security Payload," draft-mcgrew-ipsec-scesp-00.txt, Jul. 2000, XP093135760, 9 pages.

ENCRYPTION METHOD, DECRYPTION METHOD, AND RELATED APPARATUS

CROSS-REFERENCE TO RELATED APPLICATIONS

This is a continuation of U.S. patent application Ser. No. 17/013,643, filed on Sep. 6, 2020, which is a continuation of U.S. patent application Ser. No. 15/965,854, filed on Apr. 28, 2018, now U.S. Pat. No. 10,771,966, which is a continuation of U.S. patent application Ser. No. 14/263,253, filed on Apr. 28, 2014, now U.S. Pat. No. 9,992,669, which is a continuation of Int'l Patent App. No. PCT/CN2012/083661, filed on Oct. 29, 2012, which claims priority to Chinese Patent App. No. 201110331957.0, filed on Oct. 27, 2011, all of which are incorporated by reference.

FIELD

The present application relates to the field of wireless communications technologies, and in particular, to an encryption method, a decryption method, and related apparatuses.

BACKGROUND

Machine to machine (M2M) technology is a combination of wireless communications technology and information technology. It allows a machine to directly communicate with another machine without human intervention.

M2M communication is also referred to as machine type communication (MTC). An M2M communication system is significantly different from a traditional human to human (H2H) communication system. Due to large number of devices involved, low mobility, low communication traffic, etc., the M2M communication system has many features of a machine-type communication system. M2M communication systems are referred to as MTC communication systems in the current 3rd Generation Partnership Project (3GPP) standards. In the case of small data transmission, short message services (SMS) or Internet Protocol (IP) packets are started to be used in communications between machines.

When SMS small data or IP packet small data is encapsulated in a tracking area update (TAU) request or a new initial layer-3 message, how to provide confidentiality protection to a part of small data in the initial layer-3 message and to parameters that require protection becomes a problem.

SUMMARY

Embodiments of the present application provide an encryption method, a decryption method, and a related apparatus, so as to provide confidentiality protection for a part of data to be encrypted in an initial layer-3 message.

One aspect of the present application provides an encryption method, including: generating a keystream, where the keystream is used to encrypt a part of data to be encrypted in an initial layer-3 message, and the part of data to be encrypted includes small data; and generating, by performing an exclusive OR operation on the keystream and the initial layer-3 message, an initial layer-3 message in which the part of data is encrypted; and sending the initial layer-3 message in which the part of data is encrypted, where the initial layer-3 message includes an added encryption indication, and the encryption indication is used to indicate that the part of data to be encrypted in the initial layer-3 message is encrypted, so that a network side generates a keystream according to the added encryption indication, and then decrypts, according to the generated keystream, the initial layer-3 message in which the part of data is encrypted.

Another aspect of the present application further provides a decryption method, including: receiving an initial layer-3 message in which a part of data is encrypted, where the initial layer-3 message includes an added encryption indication, and the encryption indication is used to indicate that the part of data to be encrypted in the initial layer-3 message is encrypted; generating a keystream according to the added encryption indication in the initial layer-3 message, where the keystream is used to decrypt the part of encrypted data in the initial layer-3 message, and the part of encrypted data includes small data; and generating, by performing an exclusive OR operation on the keystream and the initial layer-3 message, an initial layer-3 message in which the part of data is decrypted.

another aspect of the present application provides an encryption apparatus, including: a generating unit, configured to generate a keystream, where the keystream is used to encrypt a part of data to be encrypted in an initial layer-3 message, and the part of data to be encrypted includes small data; a processing unit, configured to generate, by performing an exclusive OR operation on the keystream that is generated by the generating unit and the initial layer-3 message, an initial layer-3 message in which the part of data is encrypted; and a transmission unit, configured to send the initial layer-3 message in which the part of data is encrypted and that is processed by the processing unit, where the initial layer-3 message includes an added encryption indication, and the encryption indication is used to indicate that the part of data to be encrypted in the initial layer-3 message is encrypted.

another aspect of the present application provides a decryption apparatus, including: a transmission unit, configured to receive an initial layer-3 message in which a part of data is encrypted, where the initial layer-3 message includes an added encryption indication, and the encryption indication is used to indicate that the part of data to be encrypted in the initial layer-3 message is encrypted; a generating unit, configured to generate a keystream according to the added encryption indication in the initial layer-3 message, where the keystream is used to decrypt the part of encrypted data in the initial layer-3 message, and the part of encrypted data includes small data; and a processing unit, configured to generate, by performing an exclusive OR operation on the keystream and the initial layer-3 message, an initial layer-3 message in which a part of data is decrypted.

It can be learned from the foregoing technical solutions that the embodiments of the present application have the following advantages: according to the embodiments of the present application, a keystream is used to encrypt a part of data to be encrypted in an initial layer-3 message, and the part of data to be encrypted includes small data; an initial layer-3 message in which the part of data is encrypted is generated by performing an exclusive OR operation on the keystream and the initial layer-3 message; and the initial layer-3 message in which the part of data is encrypted is sent, where the initial layer-3 message includes an added encryption indication, and the encryption indication is used to indicate that the part of data to be encrypted in the initial layer-3 message is encrypted. In this way, a part of data in the initial layer-3 message can be encrypted, thereby avoiding a problem that confidentiality protection cannot be performed on an initial layer-3 message in the prior art, and ensuring secure transmission of small data.

BRIEF DESCRIPTION OF THE DRAWINGS

The following briefly introduces the accompanying drawings used in describing the embodiments.

DETAILED DESCRIPTION

The following describes the technical solutions in the embodiments of the present application with reference to the accompanying drawings.

The embodiments of the present application provide an encryption method, a decryption method, and related apparatuses, for providing confidentiality protection to a part of data to be encrypted in an initial layer-3 message.

In an SMS transmission scheme in the existing art, for mobile originated (MO) transmission of SMS small data or IP packet small data, in an uplink, encrypted SMS small data or IP packet small data is encapsulated in a TAU request or a new initial layer-3 message. In a downlink, encrypted SMS small data or IP packet small data is encapsulated in a downlink non-access stratum (NAS) transport message of an S1 interface. For mobile terminated (MT) transmission of SMS small data or IP packet small data, in a downlink, encrypted SMS small data or IP packet small data is encapsulated in a downlink NAS transport message of the S1 interface. In an uplink, encrypted SMS small data or IP packet small data is encapsulated in an uplink NAS transport message of the S1 interface.

In the above small-data transmission scheme, NAS messages carried in the downlink non-access stratum transport message and the uplink non-access stratum transport message of the S1 interface do not belong to initial layer-3 messages, and in a current encryption mechanism, confidentiality protection and integrity protection can be provided to these massages. However, for the TAU request or the new initial layer-3 message, according to the current encryption mechanism that integrity protection is provided when a valid security context is available, the confidentiality protection is not provided to these types of messages. According to requirements of the small-data transmission scheme, however, confidentiality protection needs to be provided to SMS small data or IP packet small data, and therefore, when the SMS small data or IP packet small data is encapsulated in a TAU request or a new initial layer-3 message, how to provide confidentiality protection to a part of small data in the initial layer-3 message and for other parameters that require protection needs to be considered.

Figure 1:
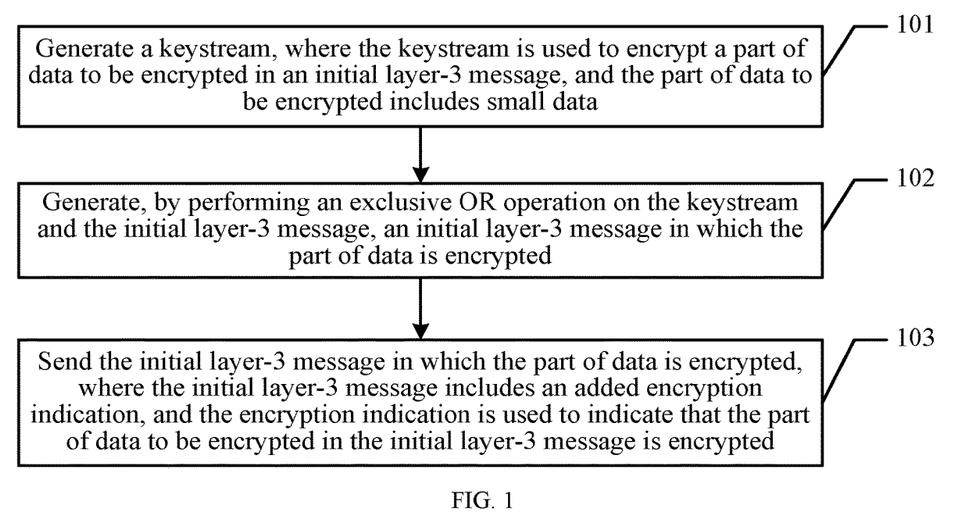
FIG. 1 is a flowchart of an encryption method according to an embodiment of the present application.

To solve the technical problem, the present application provides the following technical solutions:

FIG. 1 is a flowchart of an encryption method according to an embodiment of the present application. The method includes the following steps:

101: Generate a keystream, where the keystream is used to encrypt a part of data to be encrypted in an initial layer-3 message, and the part of data to be encrypted includes small data.

102: Generate, by performing an exclusive OR operation on the keystream and the initial layer-3 message, an initial layer-3 message in which the part of data is encrypted.

103: Send the initial layer-3 message in which the part of data is encrypted, where the initial layer-3 message includes an added encryption indication, and the encryption indication is used to indicate that the part of data to be encrypted in the initial layer-3 message is encrypted, so that a network side generates a keystream according to the added encryption indication, and then decrypts, according to the generated keystream, the initial layer-3 message in which the part of data is encrypted.

According to this embodiment of the present application, a keystream is used to encrypt a part of data to be encrypted in an initial layer-3 message, and the part of data to be encrypted includes small data; an initial layer-3 message in which the part of data is encrypted is generated by performing an exclusive OR operation on the keystream and the initial layer-3 message; and the initial layer-3 message in which the part of data is encrypted is sent, where the initial layer-3 message includes an added encryption indication, and the encryption indication is used to indicate that the part of data to be encrypted in the initial layer-3 message is encrypted. In this way, a part of data in the initial layer-3 message can be encrypted, thereby avoiding a problem that confidentiality protection cannot be performed on an initial layer-3 message in the prior art, and ensuring secure transmission of small data.

In this embodiment of the present application, an MTC communications system in the 3GPP standard implements machine-to-machine small-data communication by using NAS signaling to carry an SMS message or an IP packet, data that is transmitted during communication between machines is referred to as small data because the data amount is small, and the small data is usually carried in the SMS message or the IP packet. For transmission of MO SMS small data or IP packet small data, the SMS small data or IP packet small data is generally encapsulated in an initial layer-3 message. To implement encryption on a part of small data in an SMS message, the generated initial layer-3 message in this embodiment of the present application includes an added encryption indication, so that the network side is capable of identifying that the part of data in the initial layer-3 message is encrypted, and a receive end needs to decrypt the initial layer-3 message after receiving it. The initial layer-3 message may specifically include a TAU request message or a new initial layer-3 message. In a practical application, a specific application scenario determines which message in which SMS message small data or IP packet small data is carried, which is not limited herein. It should be noted that the new initial layer-3 message is an initial layer-3 message that is newly defined by the MTC communications system and is used to transmit small data.

In a practical application, the initial layer-3 message includes the added encryption indication, and one possible implementation manner may specifically include: adding an integrity-protected and partly ciphered parameter to a security header type parameter in the initial layer-3 message, and setting the security header type parameter to the integrity-protected and partly ciphered parameter.

It should be noted that a current security header type parameter may specifically include but is not limited to two parameters, where the two parameters are an integrity-protected parameter and an integrity-protected and ciphered parameter. In this embodiment of the present application, one integrity-protected and partly ciphered parameter is added to the Security header type and is used to indicate that a part of data to be encrypted in an initial layer-3 message is encrypted. After the integrity-protected and partly ciphered parameter is added, the security header type parameter is set to the integrity-protected and partly ciphered parameter, so that the network side identifies the part of encrypted data in the initial layer-3 message.

In a practical application, the initial layer-3 message includes the added encryption indication, and another possible implementation manner may specifically include: adding a small-data transmission indication to the initial layer-3 message, and setting the security header type parameter to an integrity-protected parameter.

In a practical application, the initial layer-3 message includes the added encryption indication, and another possible implementation manner may specifically include: adding a small-data transmission indication to the initial layer-3 message, and setting the security header type parameter to an integrity-protected and ciphered parameter.

It should be noted that in this embodiment of the present application, adding the small-data transmission indication to the initial layer-3 message indicates that the initial layer-3 message carries a part of encrypted SMS message small data or IP packet small data, and the network side needs to decrypt the part of encrypted data after receiving the initial layer-3 message.

In this embodiment of the present application, a keystream is generated to encrypt a part of data to be encrypted in an initial layer-3 message. The part of data to be encrypted in the initial layer-3 message in this embodiment of the present application includes but is not limited to small data. In a practical application, because the small data is encapsulated in an SMS message or an IP packet, and encryption means that the whole SMS message or IP packet is encrypted, the part of data to be encrypted generally includes an SMS message or an IP packet but further includes an SMS message header or an IP header; and in a practical application, content included in the part of data to be encrypted is determined by a specific implementation scenario, and no limitations are set herein.

Figure 2:
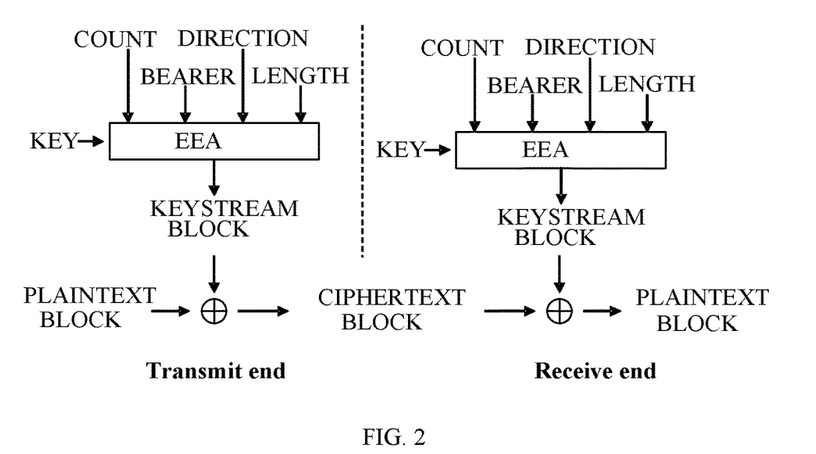
FIG. 2 is a schematic diagram of an encryption method according to another embodiment of the present application.

In an embodiment of the present application, a keystream may specifically be generated by using an evolved packet system encryption algorithm (EEA). FIG. 2 is a schematic diagram of an encryption method according to another embodiment of the present application. For example, FIG. 2 shows a data encryption mechanism: Firstly, a transmit end encrypts a plaintext by performing an exclusive OR operation on the plaintext and on a keystream that is generated by using the EEA; then, after receiving a ciphertext, a receive end generates the keystream by using the EEA and decrypts the ciphertext by performing an exclusive OR operation on the ciphertext and the generated keystream. In FIG. 2:

KEY is an encrypted key parameter and may be used to generate different keystreams for different users;

BEARER is a radio bearer identifier parameter and may be used to generate different keystreams for different bearers of a same user, and for NAS signaling, BEARER is a constant value 0x00;

DIRECTION refers to a transmission direction parameter and may be used to generate different keystreams in different transmission directions of a same bearer of a same user. For an uplink message, a value of DIRECTION is 0; and for a downlink message, a value of DIRECTION is 1;

COUNT is a counter value parameter and may be used to generate different keystreams for same messages in a same transmission direction of a same bearer of a same user;

LENGTH is a length parameter and may be used to generate a keystream that has a same length as that of a plaintext. The value of LENGTH affects only a length of the keystream and does not affect bits in the keystream;

KEY STREAM BLOCK is a generated keystream;

PLAIN TEXT BLOCK is a part of data to be encrypted (that is, plaintext); and

CIPHER TEXT BLOCK is the generated ciphertext.

In a practical application, a possible implementation manner for generating a keystream may specifically include: setting a value of a length parameter (that is, LENGTH) of a keystream that needs to be generated to a value of a length of a part of data to be encrypted in an initial layer-3 message, where the length parameter is an input parameter for the evolved packet system encryption algorithm; and generating the keystream by using the evolved packet system encryption algorithm and using the length parameter as the input parameter, where: it should be noted that the value of LENGTH of the keystream is set to the value of the length of the part of data to be encrypted in the initial layer-3 message, and then the keystream is generated according to the EPS encryption algorithm. For example, if the value of the length of the part of data to be encrypted in the initial layer-3 message is 3 bits, the value of LENGTH in the generated keystream is 3 bits; and generating, by performing an exclusive OR operation on the keystream and the part of data to be encrypted in the initial layer-3 message, an initial layer-3 message in which the part of data is encrypted. For example, if the value of the length of the part of data to be encrypted in the initial layer-3 message is 3 bits, the value of the input parameter LENGTH is set to 3; it is assumed that the generated keystream is 101, and the part of data to be encrypted in the initial layer-3 message is 110, the part of encrypted data that is finally generated after the exclusive OR operation is performed on the keystream and on the part of data to be encrypted in the initial layer-3 message is 011.

In a practical application, another possible implementation manner for generating a keystream may specifically include: setting a value of a length parameter of a keystream that needs to be generated to a value of a length of a variable in an initial layer-3 message or to a value of a length of the initial layer-3 message, where the length parameter is an input parameter for the evolved packet system encryption algorithm; generating the keystream by using the evolved packet system encryption algorithm and using the length parameter as the input parameter; and truncating the generated keystream according to a length of a part of data to be encrypted, where a length of the keystream after truncating is the same as the length of the part of data to be encrypted in the initial layer-3 message.

An implementation manner for generating an initial layer-3 message in which a part of data is encrypted is as follows: generating, by performing an exclusive OR operation on the keystream and on the part of data to be encrypted in the initial layer-3 message, an initial layer-3 message in which the part of data is encrypted.

It should be noted that the value of the input parameter LENGTH of the keystream is set to the value of the length of the initial layer-3 message or to the value of the length of the variable in the initial layer-3 message (however, the length of the variable in the initial layer-3 message is greater than the length of the part of data to be encrypted, and the value of the length of the initial layer-3 message is also greater than the length of the part of data to be encrypted); then the keystream is generated according to the EPS encryption algorithm; because only the part of data to be encrypted in the initial layer-3 message needs to be encrypted, the keystream is truncated after the keystream is generated, where the length of the keystream after the truncating is the same as the length of the part of data to be encrypted in the initial layer-3 message. When the keystream is truncated, it may be truncated in a manner of starting from the most significant bit to the least significant bit or in a manner of starting from the least significant bit to the most significant bit, or according to another truncation rule. This may be determined according to a specific implementation scenario in a practical application, and no limitations are set herein. For example, if the value of the length of the initial layer-3 message or the value of the length of the variable in the initial layer-3 message is 9, the value of LENGTH is set to 9; it is assumed that the generated keystream is 111010100, and the length of the part of data to be encrypted in the initial layer-3 message is 5 bits, the generated keystream is truncated in a manner of starting from the most significant bit to the least significant bit, and the keystream after the truncating is 11101; and it is assumed that the part of data to be encrypted in the initial layer-3 message is 00110, the part of encrypted data that is finally generated after the exclusive OR operation is performed on the keystream after the truncating and on the part of data to be encrypted in the initial layer-3 message is 11011.

It should be noted that if the value of the length of the variable in the initial layer-3 message equals the length of the part of data to be encrypted. For details, refer to the description about "setting a value of a length parameter (that is, LENGTH) of a keystream that needs to be generated to a value of a length of a part of data to be encrypted in an initial layer-3 message". No further details are provided herein.

In a practical application, another possible implementation manner for generating a keystream may specifically include: setting a value of LENGTH of a keystream that needs to be generated to a value of a length of an initial layer-3 message (the value of the length of the initial layer-3 message is greater than a length of a part of data to be encrypted); generating the keystream by using the evolved packet system encryption algorithm and using the length parameter as an input parameter; acquiring, according to a format of the initial layer-3 message and the length of the part of data to be encrypted, a start bit and a stop bit of the part of data to be encrypted in the initial layer-3 message; reserving bits that correspond to bits from the start bit to the stop bit in the keystream; and replacing other bits except the bits from the start bit to the stop bit in the keystream with 0.

It should be noted that the value of LENGTH of the keystream is set to the value of the length of the initial layer-3 message; the keystream is generated according to the EPS encryption algorithm; because only the part of data to be encrypted in the initial layer-3 message is encrypted, the start bit and the stop bit of the part of data to be encrypted in the initial layer-3 message may be acquired after the keystream is generated; and then bits that correspond to the bits from the start bit to the stop bit in the keystream are reserved, and other bits except the bits from the start bit to the stop bit in the keystream are replaced with 0, equivalent to that only the part of data to be encrypted in the initial layer-3 message is encrypted. For example, if the value of the length of the initial layer-3 message is 17, the LENGTH parameter is set to 17; it is assumed that the generated keystream is 01011010100111001, the start bit of the part of data to be encrypted in the initial layer-3 message is the 4th bit, and the stop bit of the part of data to be encrypted is the 8th bit; for the keystream, bits from the 4th bit to the 8th bit in the generated keystream need to be reserved (that is, bits 11010 are reserved), other bits in the keystream are replaced with 0, and a keystream that finally undergoes the exclusive OR operation with the initial layer-3 message is 00011010000000000. It is assumed that the initial layer-3 message is 11111010000000111, the generated initial layer-3 message in which the part of data is encrypted is 11100000000000111.

In a practical application, another possible implementation manner for generating a keystream may specifically include: setting a value of a LENGTH of a keystream to be generated to a value of a length of a variable in the initial layer-3 message (but the length of a variable part is greater than a length of part of data to be encrypted); generating the keystream by using the length parameter as an input parameter and using the evolved packet system encryption algorithm; acquiring, according to a format of the initial layer-3 message and the length of the part of data to be encrypted, a start bit and a stop bit of the part of data to be encrypted in the initial layer-3 message; reserving bits that correspond to bits from the start bit to the stop bit in the keystream; and replacing other bits than the bits from the start bit to the stop bit in the keystream with 0. An implementation manner for generating an initial layer-3 message in which a part of data is encrypted is as follows: generating, by performing an exclusive OR operation on the keystream and the variable in the initial layer-3 message, the initial layer-3 message in which the part of data is encrypted.

It should be noted that the value of LENGTH of the keystream is set to the value of the variable in the initial layer-3 message; the keystream is generated according to the EPS encryption algorithm; because only the part of data to be encrypted in the initial layer-3 message is encrypted, the start bit and the stop bit of the part of data to be encrypted in the initial layer-3 message may be acquired after the keystream is generated; and then bits that correspond to the bits from the start bit to the stop bit in the keystream are reserved, and the other bits in the keystream except the bits from the start bit to the stop bit are replaced with 0, equivalent to that only the part of data to be encrypted in the initial layer-3 message is encrypted. For example, it is assumed that the generated keystream is 01011010100111001, the start bit of the part of data to be encrypted in the initial layer-3 message is the 4th bit, and the stop bit of the part of data to be encrypted is the 8th bit, for the keystream, bits from the 4th bit to the 8th bit need to be reserved in the generated keystream (that is, bits 11010 are reserved), other bits in the keystream are replaced with 0, and a keystream that finally undergoes the exclusive OR operation with the initial layer-3 message is 00011010000000000. It is assumed that the variable part in the initial layer-3 message is 11111010000000111, the encrypted variable part is 11100000000000111.

In this embodiment of the present application, after the keystream is generated in step 101, the initial layer-3 message in which the part of data is encrypted may be obtained by performing an exclusive OR operation on the keystream and the initial layer-3 message, or the variable in the initial layer-3 message, or the part of data to be encrypted in the initial layer-3 message. For example, as shown in FIG. 2, CIPHER TEXT BLOCK may be obtained by performing an exclusive OR operation on PLAIN TEXT BLOCK and KEY STREAM BLOCK at the transmit end. Similarly, PLAIN TEXT BLOCK may be decrypted by performing an exclusive OR operation on CIPHER TEXT BLOCK and KEY STREAM BLOCK after the receive end receives CIPHER TEXT BLOCK.

In this embodiment of the present application, an initial layer-3 message includes an added encryption indication, so that after receiving the initial layer-3 message, a network side learns that a part of data to be encrypted in the initial layer-3 message is encrypted, then generates a keystream used to encrypt the part of data to be encrypted in the initial layer-3 message, and finally obtains, by performing an exclusive OR operation, the initial layer-3 message in which the part of data is encrypted, thereby providing confidentiality protection for the part of data to be encrypted in the initial layer-3 message.

Figure 3:
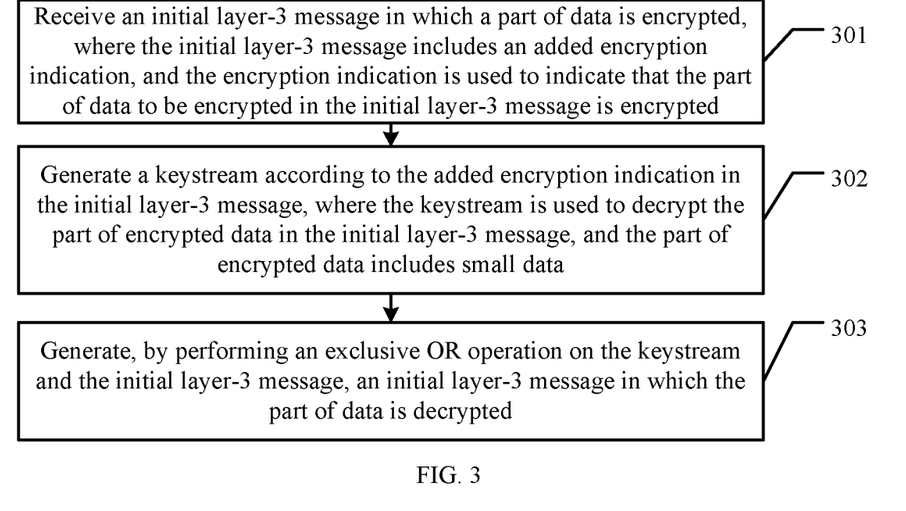
FIG. 3 is a flowchart of a decryption method according to an embodiment of the present application.

The foregoing embodiments describe the encryption method according to an embodiment of the present application. The following describes a decryption method according to an embodiment of the present application. FIG. 3 is a flowchart of a decryption method according to an embodiment of the present application. Refer to FIG. 3. The method includes the following steps:

301: Receive an initial layer-3 message in which a part of data is encrypted, where the initial layer-3 message includes an added encryption indication, and the encryption indication is used to indicate that the part of data to be encrypted in the initial layer-3 message is encrypted.

302: Generate a keystream according to the added encryption indication in the initial layer-3 message, where the keystream is used to decrypt the part of encrypted data in the initial layer-3 message, and the part of encrypted data includes small data.

303: Generate, by performing an exclusive OR operation on the keystream and the initial layer-3 message, an initial layer-3 message in which the part of data is decrypted.

In this embodiment of the present application, an initial layer-3 message in which a part of data is encrypted is received, where the initial layer-3 message includes an added encryption indication, and the encryption indication is used to indicate that the part of data to be encrypted in the initial layer-3 message is encrypted; a keystream is generated according to the added encryption indication in the initial layer-3 message, where the keystream is used to decrypt the part of encrypted data in the initial layer-3 message, and the part of encrypted data includes small data; and a decrypted initial layer-3 message is generated by performing an exclusive OR operation on the keystream and the initial layer-3 message. In this way, a part of data in the initial layer-3 message can be decrypted, thereby avoiding a problem that confidentiality protection cannot be performed on an initial layer-3 message in the prior art, and ensuring secure transmission of small data.

In this embodiment of the present application, for a receive end of an MTC communications system, after receiving an initial layer-3 message in which a part of data is encrypted and that is sent by a transmit end of the MTC communications system, the receive end learns, according to the added encryption indication in the initial layer-3 message, that the part of data in the initial layer-3 message is already encrypted.

In a practical application, for learning, according to the added encryption indication in the initial layer-3 message, that the part of data in the initial layer-3 message is already encrypted, one possible implementation manner is as follows: acquiring, according to an integrity-protected and partly ciphered parameter in the initial layer-3 message, that the part of data in the initial layer-3 message is already encrypted.

It should be noted that if a security header type parameter in the initial layer-3 message is set to the integrity-protected and partly ciphered parameter, it can be learned that the part of data in the initial layer-3 message is already encrypted.

In a practical application, for learning, according to the added encryption indication in the initial layer-3 message, that the part of data in the initial layer-3 message is already encrypted, another possible implementation manner is as follows: learning, according to a small-data transmission indication and an integrity-protected parameter in the initial layer-3 message, that the part of data in the initial layer-3 message is already encrypted; or learning, according to a small-data transmission indication and an integrity-protected and ciphered parameter in the initial layer-3 message, that the part of data in the initial layer-3 message is already encrypted.

That is, if a small-data transmission indication exists in the initial layer-3 message, it may be learned that the part of data in the initial layer-3 message is already encrypted regardless of whether the security header type parameter in the initial layer-3 message is set to the integrity-protected parameter or the integrity-protected and ciphered parameter.

In this embodiment of the present application, after it is learned that the part of data in the initial layer-3 message is already encrypted, the keystream is generated to decrypt the part of encrypted data in the initial layer-3 message. In this embodiment of the present application, the part of encrypted data in the initial layer-3 message includes but is not limited to small data. In a practical application, the small data is encapsulated in an SMS message or an IP packet, but encryption is to encrypt the entire SMS message or IP packet, and an encrypted part generally includes the SMS message or the IP packet, but also includes an SMS message header or an IP packet header.

In a practical application, a possible implementation manner for generating a keystream may specifically include: setting a value of a length parameter (that is, LENGTH) of a keystream that needs to be generated to a value of a length of a part of encrypted data in the initial layer-3 message, where the length parameter is an input parameter for an evolved packet system encryption algorithm; and generating the keystream by using the evolved packet system encryption algorithm and using the length parameter as the input parameter.

It should be noted that the value of LENGTH of the keystream is set to the value of the length of the part of encrypted data in the initial layer-3 message, and then the keystream is generated according to the EPS encryption algorithm. For example, if the value of the length of the encrypted part in the initial layer-3 message is 3 bits, the value of LENGTH in the generated keystream is 3 bits.

An implementation manner for generating the initial layer-3 message in which the part of data is decrypted may include: generating, by performing an exclusive OR operation on the keystream and on the part of encrypted data in the initial layer-3 message, the initial layer-3 message in which the part of data is decrypted. For example, if the value of the length of the part of encrypted data in the initial layer-3 message is 3 bits, the value of LENGTH is set to 3; it is assumed that the generated keystream is 101, and the part of encrypted data in the initial layer-3 message is 011, the decrypted data that is finally generated after the exclusive OR operation is performed on the keystream and on the part of encrypted data in the initial layer-3 message is 110.

In a practical application, another possible implementation manner for generating a keystream may specifically include: setting a value of a length parameter to a value of a length of a variable in the initial layer-3 message or to a value of a length of the initial layer-3 message, where the length parameter is an input parameter for an evolved packet system encryption algorithm; generating a keystream by using the evolved packet system encryption algorithm and using the length parameter as the input parameter; and truncating the generated keystream according to the length of the part of encrypted data, where the length of the keystream after the truncating is the same as the length of the encrypted part in the initial layer-3 message.

An implementation manner for generating the initial layer-3 message in which the part of data is decrypted may include: generating, by performing an exclusive OR operation on the keystream and on the part of encrypted data in the initial layer-3 message, the initial layer-3 message in which the part of data is decrypted.

It should be noted that a value of LENGTH of a keystream is set to a value of a length of the initial layer-3 message, or to a value of a length of a variable in the initial layer-3 message (however, a length of a variable part needs to be greater than a length of a part of data to be encrypted, and the value of the length of the initial layer-3 message is also greater than the length of the part of data to be encrypted); then the keystream is generated according to an EPS encryption algorithm; because only an encrypted part in the initial layer-3 message needs to be decrypted, after the keystream is generated, the keystream is truncated to have the same length as that of the part of encrypted data in the initial layer-3 message. When the keystream is truncated, it may be truncated in a manner of starting from the most significant bit to the least significant bit or in a manner of starting from the least significant bit to the most significant bit, or according to another truncation rule. This may be determined according to a specific implementation scenario in a practical application, and no limitations are set herein. For example, if the value of the length of the initial layer-3 message or the value of the length of the variable in the initial layer-3 message is 9, the value of LENGTH is set to 9; it is assumed that the generated keystream is 111010100, and the length of the part of encrypted data in the initial layer-3 message is 5 bits, the generated keystream is truncated in a manner of starting from the most significant bit to the least significant bit, and the keystream after the truncating is 11101; and it is assumed that the part of encrypted data in the initial layer-3 message is 11011, the decrypted data that is finally generated after the exclusive OR operation is performed on the keystream after the truncating and on the part of encrypted data in the initial layer-3 message is 00110.

In a practical application, another possible implementation manner for generating a keystream may specifically include: setting a value of a length parameter to a value of a length of the initial layer-3 message (the value of the length of the initial layer-3 message is greater than a length of a part of encrypted data); generating a keystream by using the length parameter as an input parameter and using the evolved packet system encryption algorithm; acquiring, according to a format of the initial layer-3 message and the length of the part of encrypted data, a start bit and a stop bit of the part of encrypted data that are in the initial layer-3 message; reserving bits that correspond to bits from the start bit to the stop bit in the keystream; and replacing other bits except the bits from the start bit to the stop bit in the keystream with 0.

It should be noted that the value of LENGTH of the keystream is set to the value of the length of the initial layer-3 message; the keystream is generated according to the EPS encryption algorithm; because only the part of encrypted data in the initial layer-3 message is decrypted, the start bit and the stop bit of the part of encrypted data in the initial layer-3 message may be acquired after the keystream is generated; and then bits that correspond to the bits from the start bit to the stop bit in the keystream are reserved, and other bits in the keystream are replaced with 0, equivalent to that only the part of encrypted data in the initial layer-3 message is decrypted. For example, if the value of the length of the initial layer-3 message is 17, the LENGTH parameter is set to 17, and it is assumed that the generated keystream is 01011010100111001, the start bit of the part of encrypted data in the initial layer-3 message is the 4th bit, and the stop bit of the part of encrypted data is the 8th bit, for the keystream, bits from the 4th bit to the 8th bit need to be reserved in the generated keystream (that is, bits 11010 are reserved), other bits in the keystream are replaced with 0, and a keystream that finally undergoes the exclusive OR operation with the initial layer-3 message in which the part of data is encrypted is 00011010000000000. It is assumed that the initial layer-3 message in which the part of data is encrypted is 11100000000000111, and the decrypted initial layer-3 message is 11111010000000111. In a practical application, another possible implementation manner for generating a keystream may specifically include: setting a value of a length parameter to a value of a length of a variable of the initial layer-3 message (the value of the length of the variable in the initial layer-3 message is greater than a length of a part of encrypted data), where the length parameter is an input parameter for an evolved packet system encrypted algorithm; generating a keystream by using the evolved packet system encryption algorithm and using the length parameter as the input parameter; acquiring, according to a format of the initial layer-3 message and the length of the part of encrypted data, a start bit and a stop bit of the part of encrypted data that are in the initial layer-3 message; reserving bits that correspond to bits from the start bit to the stop bit in the keystream; and replacing other bits except the bits from the start bit to the stop bit in the keystream with 0.

An implementation manner for generating an initial layer-3 message in which a part of data is decrypted is as follows: generating, by performing an exclusive OR operation on the keystream and the variable in the initial layer-3 message, the initial layer-3 message in which the part of data is decrypted.

It should be noted that the value of LENGTH of the keystream is set to the value of the length of the variable in the initial layer-3 message; the keystream is generated according to the EPS encryption algorithm; because only the part of encrypted data in the initial layer-3 message is decrypted, the start bit and the stop bit of the part of encrypted data in the initial layer-3 message may be acquired after the keystream is generated; and then bits that correspond to bits from the start bit to the stop bit in the keystream are reserved, and other bits in the keystream are replaced with 0, equivalent to that only the part of encrypted data in the initial layer-3 message is decrypted. For example, if the value of the length of the variable in the initial layer-3 message is 17, the LENGTH parameter is set to 17, and it is assumed that the generated keystream is 01011010100111001, the start bit of the part of encrypted data in the initial layer-3 message is the 4th bit, and the stop bit of the part of encrypted data is the 8th bit, for the keystream, bits from the 4th bit to the 8th bit need to be reserved in the generated keystream (that is, bits 11010 are reserved), other bits in the keystream are replaced with 0, and a keystream that finally undergoes the exclusive OR operation with the initial layer-3 message in which the part of data is encrypted is 00011010000000000. It is assumed that the variable in the initial layer-3 message is 11100000000000111, a decrypted variable is 11111010000000111. In this embodiment of the present application, the decrypted initial layer-3 message may be obtained by performing the exclusive operation on the keystream and the initial layer-3 message, or a variable part of the initial layer-3 message, or an encrypted part of the initial layer-3 message. For example, as shown in FIG. 2, PLAIN TEXT BLOCK may be obtained by performing an exclusive OR operation on CIPHER TEXT BLOCK and KEY STREAM BLOCK at the receive end.

In this embodiment of the present application, it is learned, according to an added encryption indication in an initial layer-3 message, that a part of data in the initial layer-3 message is already encrypted; therefore, the part of encrypted data in the initial layer-3 message needs to be decrypted; then a keystream that is used to decrypt the part of encrypted data in the initial layer-3 message is generated; and finally a decrypted initial layer-3 message is obtained by performing an exclusive OR operation, thereby providing confidentiality protection for the encrypted part in the initial layer-3 message.

The foregoing embodiments describe the encryption method and the decryption method that are provided in the embodiments of the present application. The following describes an encryption apparatus and a decryption apparatus that are provided in the embodiments of the present application. The encryption apparatus and the decryption apparatus that are provided in the embodiments of the present application may be specifically applied to an MTC communications system. The MTC communications system has various applications, including but not limited to the following five major applications: automatic metering (for example, a water meter, an electricity meter, or a gas meter), remote monitoring, industry security and home automation, payment system (an automatic teller machine, a support terminal, a parking meter, and the like), and remote vehicle control (such as fleet management, toll collection, vehicle recovery, and insurance premium payment based on driving conditions). Vehicle-mounted applications include handsfree, remote communications system, embedded navigation, emergency call, remote diagnosis, embedded alarming, and the like.

Figure 4:
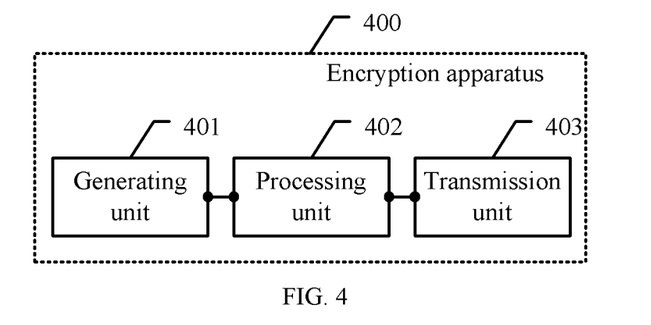
FIG. 4 is a block diagram of an encryption apparatus according to an embodiment of the present application.

An embodiment of the present application provides an encryption apparatus. FIG. 4 is a block diagram of an encryption apparatus according to an embodiment of the present application. As shown in FIG. 4, the encryption apparatus 400 includes: a generating unit 401, configured to generate a keystream, where the keystream is used to encrypt a part of data to be encrypted in an initial layer-3 message, and the part of data to be encrypted includes small data; a processing unit 402, configured to generate, by performing an exclusive OR operation on the keystream and the initial layer-3 message, an initial layer-3 message in which the part of data is encrypted; and a transmission unit 403, configured to send the initial layer-3 message in which the part of data is encrypted and that is processed by the processing unit 402, where the initial layer-3 message includes an added encryption indication, and the encryption indication is used to indicate that the part of data to be encrypted in the initial layer-3 message is encrypted.

Figure 4A:
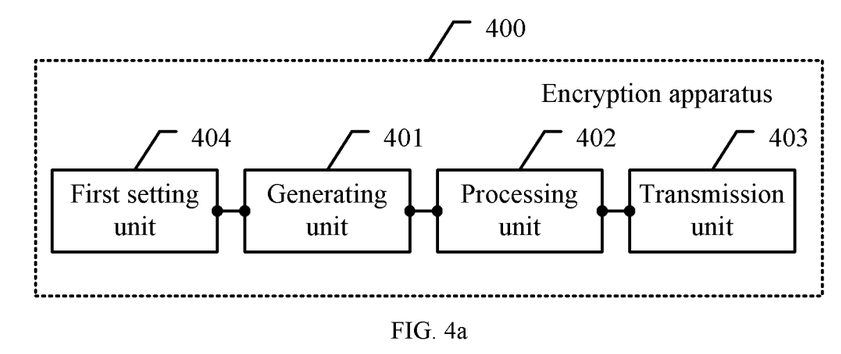
FIG. 4a is a block diagram of an encryption apparatus according to another embodiment of the present application.

FIG. 4a is an apparatus embodiment of the present application. This embodiment is a further detailed embodiment of the embodiment shown in FIG. 4. The apparatus 400 further includes: a first setting unit 404, configured to set a value of a length parameter to a value of a length of the part of data to be encrypted in the initial layer-3 message, where the length parameter is an input parameter for an evolved packet system encryption algorithm.

The generating unit 401 is specifically configured to generate a keystream by using the evolved packet system encryption algorithm and using the length parameter as the input parameter, where the length parameter is set by the first setting unit 404.

The processing unit 402 is specifically configured to generate, by performing an exclusive OR operation on the keystream that is generated by the generating unit 401 and the part of data to be encrypted in the initial layer-3 message, the initial layer-3 message in which the part of data is encrypted.

Figure 4B:
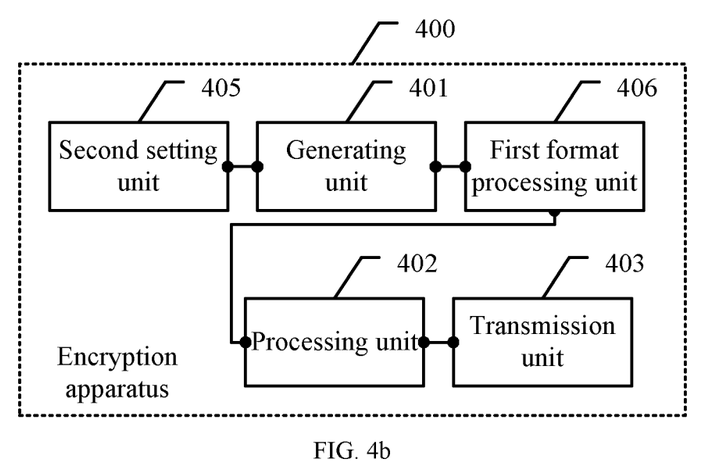
FIG. 4b is a block diagram of an encryption apparatus according to another embodiment of the present application.

FIG. 4b is a block diagram of an encryption apparatus according to another embodiment of the present application. The encryption apparatus 400 further includes: a second setting unit 405, configured to set a value of a length parameter to a value of a length of a variable in the initial layer-3 message, where the length parameter is an input parameter for the evolved packet system encryption algorithm.

The generating unit 401 is specifically configured to generate a keystream by using the evolved packet system encryption algorithm and using the length parameter as the input parameter, where the length parameter is set by the second setting unit 405.

The encryption apparatus 400 further includes: a first format processing unit 406, configured to acquire, according to a format of the initial layer-3 message and a length of the part of data to be encrypted, a start bit and a stop bit of the data to be encrypted in the initial layer-3 message; reserve bits that correspond to bits from the start bit to the stop bit in the keystream; and replace other bits except the bits from the stop bit to the stop bit in the keystream with 0.

The processing unit 402 is specifically configured to generate, by performing an exclusive OR operation on the keystream that is processed by the first format processing unit 406 and the variable in the initial layer-3 message, the initial layer-3 message in which the part of data is encrypted.

Figure 4C:
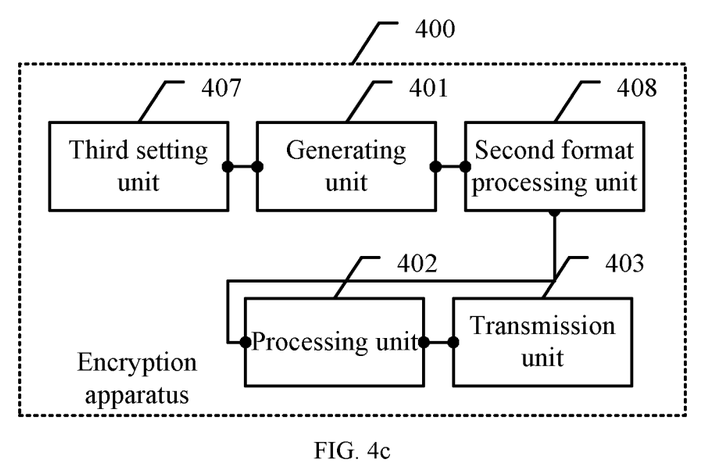
FIG. 4c is a block diagram of an encryption apparatus according to another embodiment of the present application.

FIG. 4c is a block diagram of an encryption apparatus according to another embodiment of the present application. The encryption apparatus 400 further includes: a third setting unit 407, configured to set a value of a length parameter to a value of a length of the initial layer-3 message, where the length parameter is an input parameter for the evolved packet system encryption algorithm.

The generating unit 401 is specifically configured to generate a keystream by using the evolved packet system encryption algorithm and using the length parameter as the input parameter, where the length parameter is set by the third setting unit 407.

The encryption apparatus 400 further includes: a second format processing unit 408, configured to acquire, according to a format of the initial layer-3 message and a length of the part of data to be encrypted, a start bit and a stop bit of the data to be encrypted in the initial layer-3 message; reserve bits that correspond to bits from the start bit to the stop bit in the keystream; and replace other bits except the bits from the stop bit to the stop bit in the keystream with 0.

Figure 4D:
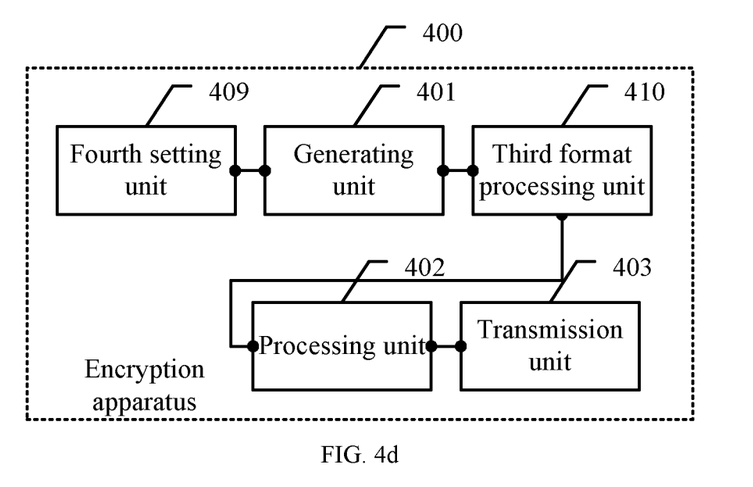
FIG. 4d is a block diagram of an encryption apparatus according to another embodiment of the present application.

FIG. 4d is a block diagram of an encryption apparatus according to another embodiment of the present application. The encryption apparatus 400 further includes: a fourth setting unit 409, configured to set a value of a length parameter to a value of a length of a variable in the initial layer-3 message or a value of a length of the initial layer-3 message, where the length parameter is an input parameter for the evolved packet system encryption algorithm.

The generating unit 401 is specifically configured to generate a keystream by using the evolved packet system encryption algorithm and using the length parameter as the input parameter, where the length parameter is set by the fourth setting unit 409.

The encryption apparatus 400 further includes: a third format processing unit 410, configured to truncate the generated keystream according to a length of the part of data to be encrypted, where a length of the truncated keystream is the same as a value of the length of the part of data to be encrypted in the initial layer-3 message.

The processing unit 402 is specifically configured to generate, by performing an exclusive OR operation on the keystream that is processed by the third format processing unit 410. and the part of data to be encrypted in the initial layer-3 message, the initial layer-3 message in which the part of data is encrypted It should be noted that the initial layer-3 message is a tracking area update request message TAU request or a new initial layer-3 message.

According to the apparatus in the present application, a keystream is generated, where the keystream is used to encrypt a part of data to be encrypted in an initial layer-3 message, and the part of data to be encrypted includes small data; an initial layer-3 message in which the part of data is encrypted is generated by performing an exclusive OR operation on the keystream and the initial layer-3 message; and the initial layer-3 message in which the part of data is encrypted is sent, where the initial layer-3 message includes an added encryption indication, and the encryption indication is used to indicate that the part of data to be encrypted in the initial layer-3 message is encrypted. In this way, a part of data in the initial layer-3 message can be encrypted, thereby avoiding a problem that confidentiality protection cannot be performed on an initial layer-3 message in the prior art, and ensuring secure transmission of small data.

Figure 5:
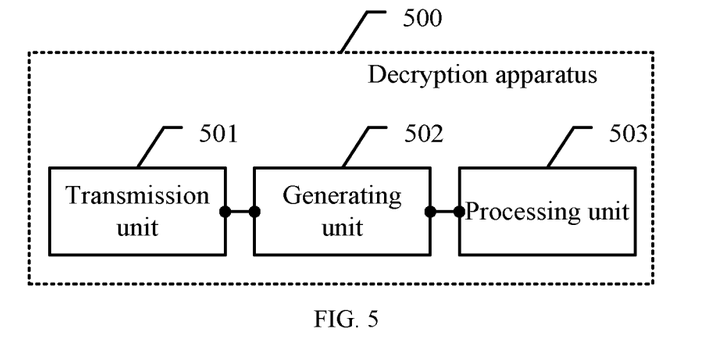
FIG. 5 is a block diagram of a decryption apparatus according to an embodiment of the present application.

FIG. 5 is a block diagram of a decryption apparatus according to an embodiment of the present application. The decryption apparatus 500 includes: a transmission unit 501, configured to receive an initial layer-3 message in which a part of data is encrypted, where the initial layer-3 message includes an added encryption indication, and the encryption indication is used to indicate that the part of data to be encrypted in the initial layer-3 message is encrypted; a generating unit 502, configured to generate a keystream according to the added encryption indication in the initial layer-3 message, where the keystream is used to decrypt the part of encrypted data in the initial layer-3 message, and the part of encrypted data includes small data; and a processing unit 503, configured to generate, by performing an exclusive OR operation on the keystream and the initial layer-3 message, an initial layer-3 message in which the part of data is decrypted.

Figure 5A:
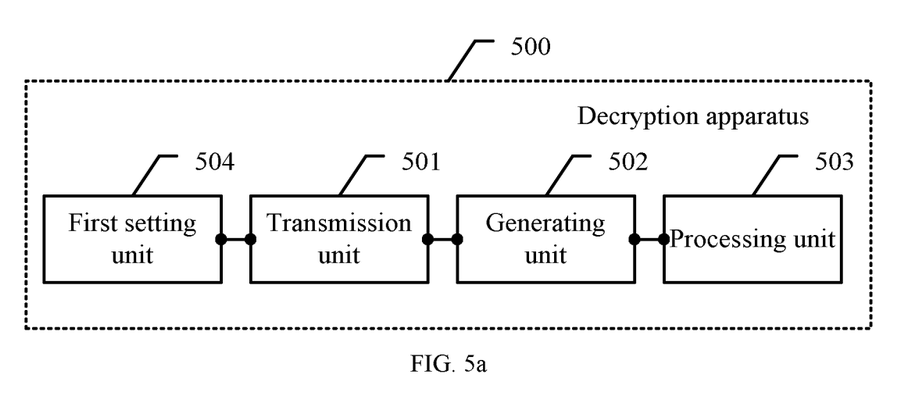
FIG. 5a is a block diagram of a decryption apparatus according to another embodiment of the present application.

FIG. 5a is a block diagram of a decryption apparatus according to another embodiment of the present application. The embodiment shown in FIG. 5a is a further detailed embodiment of the embodiment shown in FIG. 5. The decryption apparatus 500 includes: a first setting unit 504, configured to set a value of a length parameter to a value of a length of the part of encrypted data in the initial layer-3 message, where the length parameter is an input parameter for an evolved packet system encryption algorithm.

The generating unit 502 is specifically configured to generate a keystream by using the evolved packet system encryption algorithm and using the length parameter as the input parameter, where the length parameter is set by the first setting unit 504.

Figure 5B:
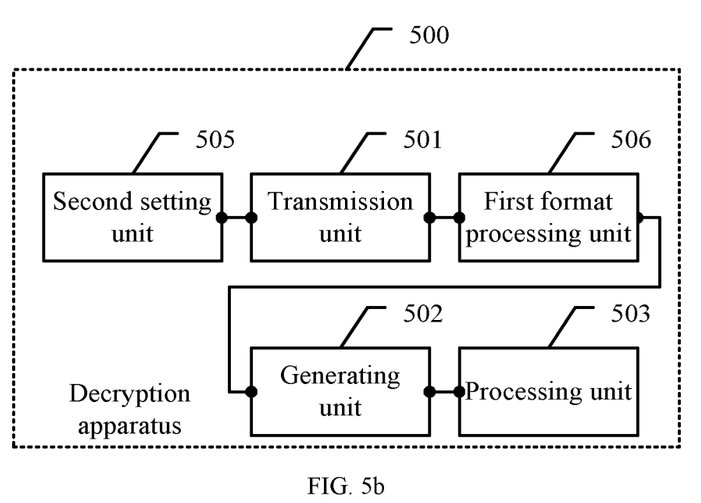
FIG. 5b is a block diagram of a decryption apparatus according to another embodiment of the present application.

The processing unit 503 is specifically configured to generate, by performing an exclusive OR operation on the keystream that is generated by the generating unit 502. and the part of encrypted data in the initial layer-3 message, the initial layer-3 message in which the part of data is decrypted FIG. 5b is a block diagram of a decryption apparatus according to another embodiment of the present application. The embodiment shown in FIG. 5b is a further detailed embodiment of the embodiment shown in FIG. 5. The decryption apparatus 500 further includes: a second setting unit 505, configured to set a value of a length parameter to a value of a length of a variable in the initial layer-3 message, where the length parameter is an input parameter for the evolved packet system encryption algorithm.

The generating unit 502 is specifically configured to generate a keystream by using the evolved packet system encryption algorithm and using the length parameter being used as the input parameter, where the length parameter is set by the second setting unit 505.

The decryption apparatus 500 further includes: a first format processing unit 506, configured to acquire, according to a format of the initial layer-3 message and a length of the part of encrypted data, a start bit and a stop bit of the encrypted data in the initial layer-3 message; reserve bits that correspond to bits from the start bit to the stop bit in the keystream; and replace other bits except the bits from the stop bit to the stop bit in the keystream with 0.

The processing unit 503 is specifically configured to generate, by performing an exclusive OR operation on the keystream that is processed by the first format processing unit 506 and the variable in the initial layer-3 message, the initial layer-3 message in which the part of data is decrypted.

Figure 5C:
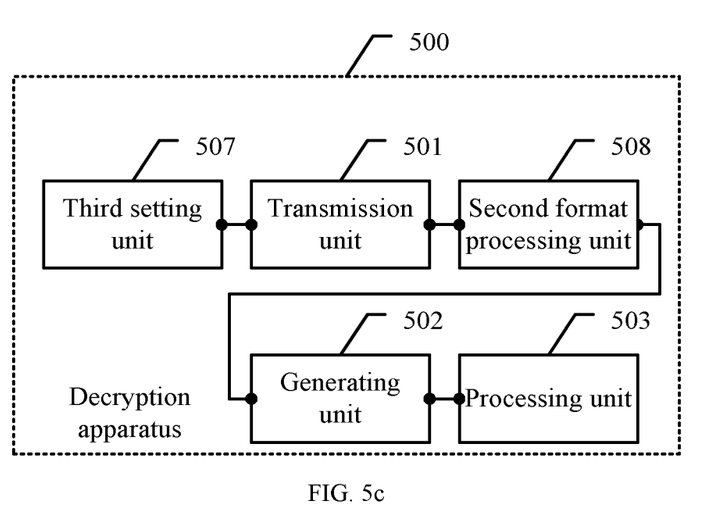
FIG. 5c is a block diagram of a decryption apparatus according to another embodiment of the present application.

FIG. 5c is a block diagram of a decryption apparatus according to another embodiment of the present application. The embodiment shown in FIG. 5c is a further detailed embodiment of the embodiment shown in FIG. 5. The decryption apparatus 500 further includes: a third setting unit 507, configured to set a value of a length parameter to a value of a length of the initial layer-3 message, where the length parameter is an input parameter for the evolved packet system encryption algorithm.

The generating unit 502 is specifically configured to generate a keystream by using the evolved packet system encryption algorithm and using the length parameter being used as the input parameter, where the length parameter is set by the third setting unit 507.

The decryption apparatus 500 further includes: a second format processing unit 508, configured to acquire, according to a format of the initial layer-3 message and a length of the part of encrypted data, a start bit and a stop bit of the encrypted data in the initial layer-3 message; reserve bits that correspond to bits from the start bit to the stop bit in the keystream; and replace other bits except the bits from the stop bit to the stop bit in the keystream with 0.

Figure 5D:
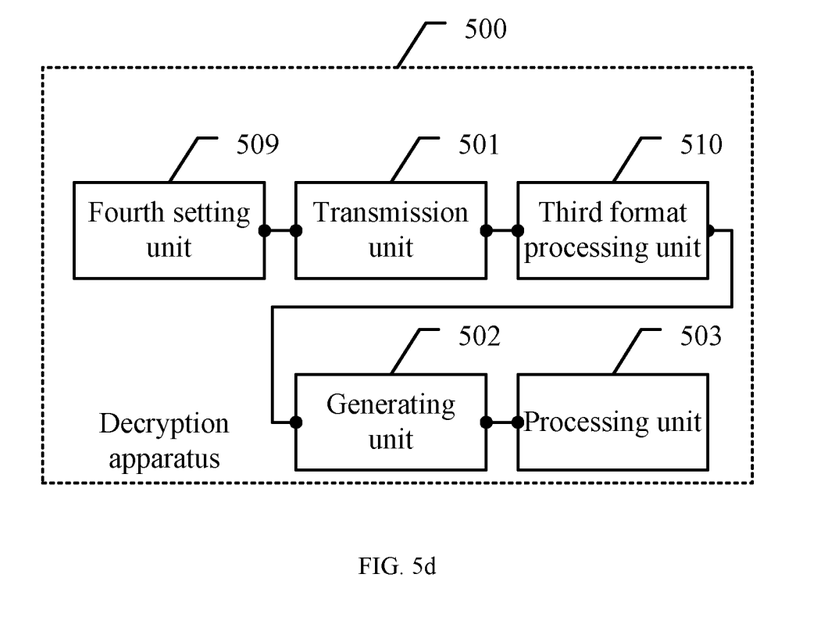
FIG. 5d is a block diagram of a decryption apparatus according to another embodiment of the present application.

FIG. 5d is a block diagram of a decryption apparatus according to another embodiment of the present application. The embodiment shown in FIG. 5d is a further detailed embodiment of the embodiment shown in FIG. 5. The decryption apparatus 500 further includes: a fourth setting unit 509, configured to set a value of a length parameter to a value of a length of a variable in the initial layer-3 message or a value of a length of the initial layer-3 message, where the length parameter is an input parameter for the evolved packet system encryption algorithm.

The generating unit 502 is specifically configured to generate a keystream by using the evolved packet system encryption algorithm and using the length parameter being used as the input parameter, where the length parameter is set by the fourth setting unit 509.

The decryption apparatus 500 further includes: a third format processing unit 510, configured to truncate the generated keystream according to a length of the part of encrypted data, where a length of the truncated keystream is the same as a value of the length of the encrypted part in the initial layer-3 message.

The processing unit 503 is specifically configured to generate, by performing an exclusive OR operation on the keystream that is processed by the third format processing unit 510 and the part of encrypted data in the initial layer-3 message, the initial layer-3 message in which the part of data is decrypted.

According to the apparatus provided in the present application, an initial layer-3 message in which a part of data is encrypted is received, where the initial layer-3 message includes an added encryption indication, and the encryption indication is used to indicate that a part of data to be encrypted in the initial layer-3 message is encrypted; a keystream is generated according to the added encryption indication in the initial layer-3 message, where the keystream is used to decrypt the part of encrypted data in the initial layer-3 message, and the part of encrypted data includes small data; and a decrypted initial layer-3 message is generated by performing an exclusive OR operation on the keystream and the initial layer-3 message. In this way, a part of data in the initial layer-3 message can be decrypted, thereby avoiding a problem that confidentiality protection cannot be performed on an initial layer-3 message in the prior art, and ensuring secure transmission of small data.

It should be noted that content about processes of information exchange, execution, and the like between various modules or units of the apparatuses is based on same thoughts as the method embodiments of the present application, and a technical effect brought by the apparatuses is the same as that of the method embodiments of the present application; and for specific content, reference may be made to the description in the method embodiment, as shown in FIG. 3, of the present application, and no further details are provided herein.

In this embodiment of the present application, it is learned, according to an added encryption indication in an initial layer-3 message, that a part of data in the initial layer-3 message is already encrypted; therefore, the part of encrypted data in the initial layer-3 message needs to be decrypted; then a keystream that is used to decrypt the part of encrypted data in the initial layer-3 message is generated; and finally a decrypted initial layer-3 message is obtained by performing an exclusive OR operation, thereby providing confidentiality protection for the part of data to be encrypted in the initial layer-3 message.

A person of ordinary skill in the art may understand that all or a part of the steps of the methods in the foregoing embodiments may be implemented by a program instructing relevant hardware. The program may be stored in a computer readable storage medium. The storage medium may be a read-only memory, a magnetic disk, or an optical disc.

The foregoing describes in detail an encryption method, a decryption method, and related apparatuses that are provided in the preset application. A person of ordinary skill in the art may make modifications to the specific implementations and application scopes according to the idea of the embodiments of the present application. In conclusion, the content of this specification should not be construed as a limitation to the present application.

The invention claimed is:

1. A method comprising:
   receiving an initial layer-3 message comprising an encrypted part and an encryption indication indicating which part of the initial layer-3 message is encrypted;
   generating a keystream according to the encryption indication; and
   decrypting the encrypted part using the keystream.

2. The method of claim 1, wherein decrypting the encrypted part using the keystream comprises decrypting the encrypted part by performing an exclusive OR operation on the keystream and the encrypted part.

3. The method of claim 1, wherein the encrypted part comprises encrypted data, and wherein the encrypted data comprise small data or short message service (SMS) messages.

4. The method of claim 3, wherein a first length of the keystream is based on a second length of the encrypted data.

5. The method of claim 4, wherein the first length is equal to the second length.

6. The method of claim 3, wherein generating the keystream comprises generating the keystream using an encryption algorithm, and wherein a length of the encrypted data is an input parameter of the encryption algorithm.

7. A method comprising:
   generating a keystream for providing confidentiality protection for data;
   encrypting the data by performing an exclusive OR operation on the keystream and the data to obtain encrypted data; and
   sending, to a network device, an initial layer-3 message including an encryption part comprising the encrypted data and an encryption indication indicating which part of the initial layer-3 message is encrypted.

8. The method of claim 7, wherein the data comprise small data or short message service (SMS) messages.

9. The method of claim 7, wherein generating the keystream comprises:
   setting a value of a length parameter according to a length of the data; and
   generating the keystream using an encryption algorithm, wherein the length parameter is an input parameter of the encryption algorithm.

10. The method of claim 7, wherein a first length of the keystream is based on a second length of the data.

11. The method of claim 10, wherein the first length is equal to the second length.

12. An apparatus comprising:
a memory configured to store instructions; and
a processor coupled to the memory and configured to execute the instructions to cause the apparatus to:
receive an initial layer-3 message comprising an encrypted part and an encryption indication indicating which part of the initial layer-3 message is encrypted;
generate a keystream according to the encryption indication; and
decrypt the encrypted part using the keystream.

13. The apparatus of claim 12, wherein the processor is further configured to execute the instructions to cause the apparatus to decrypt the encrypted part by performing an exclusive OR operation on the keystream and the encrypted part.

14. The apparatus of claim 12, wherein the encrypted part comprises encrypted data, and wherein the encrypted data comprise small data or short message service (SMS) messages.

15. The apparatus of claim 14, wherein a first length of the keystream is equal to a second length of the encrypted data.

16. The apparatus of claim 14, wherein the processor is further configured to execute the instructions to cause the apparatus to generate the keystream by using an encryption algorithm, and wherein a length of the encrypted data is an input parameter of the encryption algorithm.

17. An apparatus comprising:
a memory configured to store program instructions; and
a processor coupled to the memory and configured to execute the instructions to cause the apparatus to:
generate a keystream for providing confidentiality protection for a data;
encrypt the data by performing an exclusive OR operation on the keystream and the data to obtain encrypted data; and
send, to a network device, an initial layer-3 message including an encryption part comprising the encrypted data and an encryption indication indicating which part of the initial layer-3 message is encrypted.

18. The apparatus of claim 17, wherein the data comprise small data or short message service (SMS) messages.

19. The apparatus of claim 17, wherein the processor is further configured to execute the instructions to cause the apparatus to generate the keystream by:
setting a value of a length parameter according to a length of the data; and
generating the keystream using an encryption algorithm, wherein the length parameter is an input parameter of the encryption algorithm.

20. The apparatus of claim 17, wherein a first length of the keystream is based on a second length of the data.

* * * * *